May 9, 1950 F. A. HOWARD ET AL 2,507,105
PROCESS FOR THE FRIEDEL-CRAFTS CATALYZED LOW
TEMPERATURE POLYMERIZATION OF ISOOLEFINS
Filed July 15, 1944 4 Sheets-Sheet 4

FIG. - 4.

Frank A. Howard
A. Donald Green  Inventors
By  Attorney

Patented May 9, 1950

2,507,105

UNITED STATES PATENT OFFICE 2,507,105

PROCESS FOR THE FRIEDEL-CRAFTS CATALYZED LOW-TEMPERATURE POLYMERIZATION OF ISOOLEFINS

Frank A. Howard, Elizabeth, and A. Donald Green, Cranford, N. J., assignors to Standard Oil Development Company, a corporation of Delaware Application July 15, 1944, Serial No. 545,136

14 Claims. (Cl. 260—85.3)

The invention pertains to the production of high molecular weight compounds by the polymerization of olefinic materials at temperatures below $-10°$ F. in the presence of Friedel-Crafts type catalysts.

In the production of high molecular rubberlike polymers and particularly interpolymers of an isomonoolefin such as isobutylene and a diolefin such as butadiene or isoprene at low temperatures and in the presence of Friedel-Crafts type catalysts, it has been found that there are certain advantages in conducting the reaction in such a way as to form the polymer as a slurry of particles in the unreacted liquid, such slurry being thin enough to permit its ready flow through tubes or conduits. For example, removal of the heat of reaction is facilitated since the slurry can be pumped past cooling surfaces. Also, ready removal of polymer from the reactor is made possible because the slurry can be caused to flow out, without need for mechanical contrivances such as screw conveyors, extruders and the like.

Numerous reactors for carrying out this reaction have been proposed, the reactor shown in application Serial No. 448,575, filed June 26, 1942, by John H. Bannon, now abandoned, being an example of a type that has been widely used for this reaction. These reactors in general have relied upon dilution to distribute the catalyst, the catalyst solution being introduced into a zone of high turbulence in order to effect dispersion of the catalyst throughout the reaction mixture in a minimum of time. To decrease the amount of unreacted liquid that has to be removed from the system with the polymer slurry, it has been found possible to screen or filter the slurry, returning clear liquid or a thinner slurry to the reactor and removing from the system a product containing a much smaller proportion of adhering unreacted liquid. This latter process is described in application Serial No. 483,882, filed April 21, 1943, by A. D. Green and W. J. Paltz.

An important advantage of the "slurry type" reaction is that it can be operated not only batchwise, but preferably with continuous feed and continuous overflow of product under polymerization conditions which can be carefully controlled and maintained uniform. By using a high degree of agitation in the reactor and with rapid dispersion of catalyst and feed, the liquid composition is essentially uniform throughout the reactor. Since the polymer is formed from the reactor liquid rather than from the undiluted feed, it is the composition of the reactor liquid (which is the same as that of the overflow liquid) which determines the properties of the polymer formed. Thus, tensile strength and curing rate of the product made in this operation are defined by the chemical composition of the reacting liquid, that is, by the proportions of reactants and "poisons." For example, if the ratio of diolefin to isoolefin in this liquid is increased, the ratio of diolefin to isoolefin in the polymer is increased, which means that under comparable vulcanizing conditions it "cures" faster. Again, if the ratio of isoolefin to inert liquid diluent is increased, the average molecular weight of the polymer is increased, which tends to give higher tensile strength. Also, increasing the ratio of normal olefins to isoolefin will reduce molecular weight, as will increasing the proportion of organic oxygenated compounds such as alcohols, ketones, ethers, etc. Molecular weight is also reduced by presence of dimers and other low molecular weight polymers of the various olefins and diolefins. It may be pointed out that by the continuous process the product, though it is a mixture of polymers of various molecular weights, is more homogeneous than the product when made batchwise since in the latter case the composition of the reacting liquid changes during the course of the reaction.

In specifying the characteristics of the polymer product to be made, it is necessary to compromise. While high molecular weight gives higher strength, a practicable limit is reached, corresponding to the limit of ready processibility of the polymer in commercial rubber compounding equipment. High diolefin content of the polymer gives the desired properties of rapid curing and high modulus, but there are practical limits here also, due to tendency to too low molecular weight and to increased manufacturing difficulties, as will be later pointed out.

When carrying out the continuous, slurry-type reaction in practice, using for example a tubular reactor with internal circulation pump as described in the above-mentioned Bannon application, it has been found that the mechanical operation of the reactor can be greatly affected by the polymerization conditions. Thus, when making polybutene (i. e. polymer of an iso-monoolefin in the absence of a diolefin) by polymerization of a mixture of isobutylene and methyl chloride, using aluminum chloride dissolved in methyl chloride as catalyst, a stable, granular-type slurry is formed which, at the formation temperature, has somewhat the appearance of a mixture of sand and water. The reactor operation under these condtions is excellent; the reaction proceeds smoothly and is not too sensitive to minor changes in operating conditions and the reactor can be run for many days before fouling of the cooling tubes or overflow pipe with polymer necessitates shutting down for cleaning.

On the other hand, if isoprene is added to the feed for the purpose of making a vulcanizable copolymer with isobutylene, with conditions otherwise being maintained as in polybutene manufacture, except that a stronger catalyst solution is usually desirable to keep down the volume of catalyst solution, the appearance of the slurry and the operation of the reactor change to an extent dependent on the ratio of isoprene to isobutylene in the reactor liquid. The slurry changes in degrees from the "sandy" type to one resembling milk or a latex in which the individual particles are indiscernible. The stability of the slurry at the same time suffers, as evidenced by a rapid coagulation to large slimy masses when the temperature is allowed to rise to a relatively slight extent. Concurrently, the reaction sometimes becomes difficult to control; that is, "runaways" will be experienced with rather small increase in catalyst rate or slight increase in reactor temperature. Of more serious import, the reactor becomes fouled much more rapidly with the higher isoprene contents, and the "runs" can become of an impractically short duration. The internal surfaces not only become coated with a skin of polymer, which reduces heat transfer and reaction capacity, but the tubes become plugged with large masses of polymer which before long cut down slurry circulation and heat removal capacity to an excessive degree. The presence of not only isoprene but of poisons such as alcohols and other organic oxygenated impurities can result in these unstable slurries.

These deleterious effects on the reactor performance can be reduced by a number of means which have been suggested and tested. Some, involving means of making the slurry more stable, are: (1) operation of the reactor at the lowest practicable temperature (but, of course, above the freezing point of the liquid), (2) adding a slurrying aid such as channel black, (3) very careful control, within narrow limits, of temperature, conversion, slurry concentration, isoprene ratio, etc. Among mechanical improvements to the reactor to make it less sensitive to the unstable slurries are: (1) high degree of agitation, and (2) use of larger tubes, annular passages or the like for cooling surface so that much larger polymer agglomerates can be tolerated without plugging the passages.

Such methods, although they considerably help the situation, do not attempt to change the character or mechanism of the polymer formation. Experimental study indicates that the basic difference in operation due to the isoprene is a marked slowing down in rate of reaction. This is evidenced by the so-called "after-polymerization" found in laboratory batch polymerizations with high ratios of isoprene to isobutylene in the liquid. Polymerization can still be proceeding appreciably several minutes after stopping catalyst addition. In laboratory polybutene preparation, the reaction goes to completion almost instantaneously. The milky slurry is due to slow formation of polymer in the main body of the slurry, whereas the sandy particles are presumably formed by rapid reaction in the vicinity of the catalyst injection points.

The aluminum chloride catalyst or other Friedel-Crafts type catalyst becomes completely consumed during the reaction, either by reaction with water, oxygenated impurities, hydrocarbons, etc., or by entering into the polymer molecule itself. Care is always taken to maintain an excess of olefin and diolefin, i. e., the hydrocarbon conversion is not allowed to reach 100%, 50 to 90% olefin conversion being the usual range. In polybutene formation the reaction is so fast that the concentration of free or unconsumed catalyst is extremely small, but with high isoprene concentrations due to the poisoning effect of the isoprene, the reaction becomes much slower and appreciable quantities of free catalyst are present in the reactor. This inventory of free catalyst can vary rapidly since it is a function of numerous variables, which results in reaction "runaways" and increased difficulty of control.

It has been proposed that this free catalyst in the main body of reactants be destroyed by continuous or intermittent addition of a poison, preferably one such as ammonia which eliminates the aluminum chloride without affecting the molecular weight of the polymer. This method, while it does greatly improve slurry stability, is difficult to control from the standpoint of adjusting catalyst and poison flow to give a reasonably constant conversion of hydrocarbon.

It has also been proposed to speed up the reaction and thereby greatly decrease residual free catalyst inventory by reducing the degree of agitation where the catalyst contacts the hydrocarbons. This can be done on a laboratory scale but is very difficult to control in commercial equipment. In particular, in the large equipment insufficient agitation at any point can result in formation of polymer lumps causing equipment plugging. Another proposal is the use of very strong catalyst solution, but with high degree of agitation. This is in the direction of faster reaction but as a complete solution to the problem has the disadvantages of difficult control due to presence of very small but varying amounts of oxygenated impurities in the catalyst solvent, as well as a limit on solubility of catalyst in the solvent (aluminum chloride in methyl chloride).

The poorer reactor operation with the milky slurry and the greater instability of the latter as compared to the sandy slurry is not so much due to the difference in particle size but rather to presence of free catalyst which causes "after polymerization," resulting in slimy, solvated polymer which "cements" and agglomerates the polymer already formed. The sandy or milky appearance of the slurry is therefore mainly a symptom showing whether the reaction is occurring at a fast or slow rate. It is, of course, possible to have the reaction take place too fast so that excessively large agglomerates are formed at the catalyst injection nozzles and molecular weight can be lowered because of local depletion of reactants.

While, within the limits, the particle size of the polymer in itself probably doesn't have much to do with reactor operation, it does have great bearing on any cold slurry screening or filtering operation, as in the above-mentioned Green and Paltz application. Thus, with the sandy-type slurry the latter can be successfully handled on a vibrating screen of usual type. This becomes less practicable, the more the slurry approaches the milky kind, where a considerable proportion of the particles can be under 100 mesh, and some under 300 mesh. The milky slurries can be handled much more suitably with a rotary vacuum filter having a very fine cloth, but even here the fineness of the particles can introduce difficulties.

It is the object of this invention to provide the art with a method and apparatus whereby the polymerization of isomonoolefins or mixtures of isomonoolefins with diolefins may be more accurately controlled and conducted in such a manner as to decrease tendency to equipment plugging and to skin formation on cooling surfaces.

It is also an object of this invention to provide the art with a method and apparatus which permits one to obtain isomonoolefin polymers or copolymers in the form of discrete, granular particles of larger size.

These and other objects will appear more clearly from the detailed description and claims which follow:

It has now been found that a more stable slurry is obtained and less tendency to fouling the reactor encountered if the catalyst is introduced in such a manner as to effect dispersal thereof throughout only a limited part of the reaction mixture or slurry. In this way, immediate, excessive dilution of the catalyst is avoided, giving a higher catalyst concentration at the point where most of the polymer is formed resulting in a faster reaction and in the production of more polymer per unit of effective volume of the reactor.

Localization of the zone of reaction in the above-mentioned Bannon reactor can be effected by reducing the degree of agitation but is not practicable. As before mentioned, it is very difficult to obtain stable operating conditions with low agitation rates, the tendency being to localize the reaction too much and produce large masses of coalesced polymer, both in the reaction liquid and adhering to the reactor walls, causing the reactor to become plugged rapidly. It is preferred, therefore, that turbulence be maintained at a high level and the localization of the reaction be effected by adding the catalyst to only a part of the circulating slurry. This is done by adding the catalyst to a separate reaction chamber or primary zone which is preferably of appreciably smaller volume as compared with the total reactor volume. The remainder of the reactor, or the secondary zone acts mainly as a heat exchanger. For example, if the primary zone has a volume equal to about 10 to 20% of the total volume of the reactor and if the flow through this zone can be slow enough to give a residence time sufficient to permit extensive reaction or substantial complete consumption of the catalyst, it is possible to localize the reaction in the sense that it will now take place in 10 to 20% of the former volume. Accordingly, the dilution effect will be about one-tenth to about one-fifth that now experienced. Putting it conversely, it is possible in this way to concentrate the reaction five to ten-fold. By increasing the ratio of the volume of the reaction chamber to the total reactor volume to about 40 to 50%, the dilution effect will, of course, be somewhat higher but will still be only 40 to 50% of that now experienced, i. e., the reaction will be concentrated two to two and one-half times.

The rate of reaction will be increased to a greater extent than the 5 to 10-fold in the first case or the 2 to 2.5-fold in the second case, since the catalyst will not have as much chance to react with water and other impurities before it forms polymer. Otherwise the gain in reaction rate would be offset by the short time of contact in the primary zone as compared to the secondary zone and there might be little if any gain. Under commercial operating conditions, although the total amount of catalyst used is relatively small, a large part of it is generally destroyed by the oxygenated impurities such as water present as traces in the reactor liquid, and only a minor part in many cases is actually useful directly for polymer formation. Thus, when in the aforementioned Bannon reactor the catalyst is dispersed quickly into the extremely large flow of circulating slurry, the rate of formation of polymer has to compete with the rate of reaction of catalyst with water, etc. In the present invention the former rate is favored, since the catalyst is contacted with a smaller volume of liquid containing water, etc.

In order to prevent the so-called "after-polymerization" in the secondary zone where polymer film would otherwise be formed on the cooling surfaces, it is expedient to destroy the unreacted catalyst in the slurry leaving the primary zone by introducing a carefully controlled amount of poison to the secondary zone where the cooling surfaces are located or to the connector pipe through which the slurry leaving the primary zone passes to the secondary zone. It is preferable to add as poison a material which renders the aluminum chloride or other catalyst inactive but which does not act as a "chain terminator," that is, does not result in production of lower molecular weight polymer. Ammonia and water are examples of such poisons but ammonia is the preferable material because of its high solubility in the reaction mixture and because it can be readily handled. There are many other poisons which act to a more or less extent as chain terminators, such as alcohols, ethers, $SO_2$, etc. These can be used but are not as desirable as ammonia.

About one mol of ammonia is required to deactivate each mol of unreacted active catalyst, that is, about 0.13 pound of ammonia per pound of aluminum chloride. It is preferable to add to the secondary zone an excess of ammonia over that required to deactivate the aluminum chloride entering that chamber. For example, if conditions in the primary zone are such as to obtain an 80% reaction of the added aluminum chloride, the remaining 20% is deactivated upon entering the secondary zone by adding continuously to the latter, say a three-fold excess of ammonia over that necessary, in order to assure complete deactivation. A small part of the unreacted ammonia will return continuously to the primary zone, thereby adding somewhat to the required catalyst input. Elimination of the free aluminum chloride in this manner not only is of advantage from the standpoint of decreasing the tendency of fouling on the cooling surfaces, but it also tends to decrease trouble with plugging of the overflow line due to deposition of film on the latter. By the addition of ammonia it is not so essential to go to high conversions of the aluminum chloride in the primary zone.

With no appreciable cooling of the primary zone, enough slurry will have to be circulated through it to prevent an excessive temperature rise due to heat of reaction. To guard against too high a temperature which favors slurry instability, a temperature rise of only 3° to 10° F. is permitted.

The apparatus in which the present process may be carried out may assume various forms. Suitable apparatus is illustrated in the accompanying drawing in which.

Figure 1:
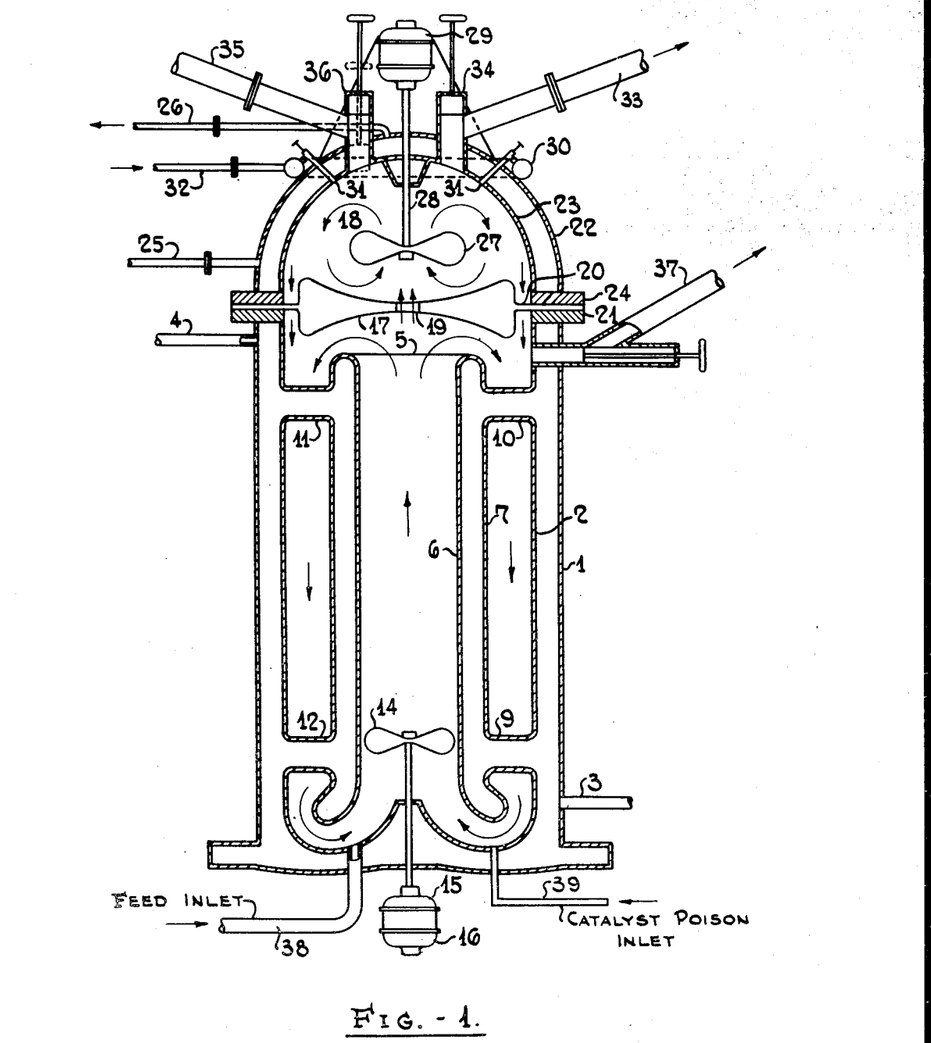
Figure 1 is a front sectional elevation of a reactor in accordance with the present invention.

Referring to Figure 1, the reactor consists of outer shell member 1 and an inner shell member 2 spaced therefrom to form a hollow space through which a suitable cooling agent may be circulated. In view of the temperatures to be maintained, liquid ethylene is a preferred refrigerant and is desirably introduced in liquid form through inlet 3, the ethylene vaporized by absorption of the heat of reaction being withdrawn through outlet 4, reliquefied by suitable compressing and cooling means (not shown) and recycled to inlet 3. A draft tube 5 consisting of an inner wall member 6 and an outer wall member 7 is arranged centrally of the reactor, connectors 9, 10, 11 and 12 serving to support the draft tube and to permit the flow of refrigerant from the space between members 1 and 2 into the space between members 6 and 7. Instead of having a single annular passageway for the return or recycling of the reaction slurry, a plurality of return tubes arranged between headers as shown in the above-mentioned Bannon application may be used. An impeller 14 is arranged near the bottom of draft tube 5 and is mounted upon a shaft 15 which is driven by a suitable source of power such as motor 16.

A baffle 17 is arranged above the draft tube in order to separate the primary zone 18 from the lower part of the reactor. An opening 19 is provided centrally of the baffle to permit some of the reaction liquid circulated in the bottom part of the reactor to pass through the baffle into the primary zone 18.

The head of the reactor comprises an outer wall member 22 and an inner wall member 23 which terminates in the flange 24 which abuts flange 21 on the lower part of the reactor. A refrigerant is supplied to the space between the walls of the head through inlet 25 and is withdrawn through outlet pipe 26 whereupon the refrigerant is compressed, reliquefied by suitable means and recycled to the inlet 25. The structure of the head may be simplified by omitting the refrigeration, in which event it would be constructed as a single walled member. The reactor head is provided with its own integral agitator 27 which is mounted on shaft 28 connected to a suitable source of power such as the motor 29. In order to maintain a more positive control of the circulation into the primary zone, shaft 28 may be extended and a propeller mounted thereon inside the opening 19 whereby a positive pumping action can be achieved.

A manifold 30 is provided on the reactor head for supplying catalyst solution to a plurality of catalyst nozzles 31 arranged around the head. A line 32 is provided for supplying catalyst solution to the manifold.

The baffle 17, if desired, can be of hollow construction and is provided with lugs or other supporting means 20 extending to and resting upon the flange 24 provided on the head. By supporting the baffle upon the flange of the head of the reactor it is possible to remove the baffle along with the reactor head which is itself removable as a unit from the reactor in order to permit inspection and/or cleaning of the reactor. If desired, means for supplying refrigerant to the baffle 17 may be provided in order to increase the cooling capacity of the reactor. The baffle may be an unitary structure or it may be constructed of a plurality of segments which are fitted together.

Instead of being uniformly spaced from the inside reactor wall to form an annular passageway for the return of reaction liquid from the primary zone, the baffle can be made the same diameter as the internal diameter of the reactor and one or a few holes could be provided for the egress of reaction liquid from the primary zone. The use of a single hole is advantageous and indicated whenever the annular passageway is reduced to a very small width to limit the amount of circulation through the primary zone since such a narrow annular opening would be prone to foul or plug whereas a single hole would give a maximum discharge and a minimum liability to plugging.

An overflow pipe 33 is provided at the top of the reactor for the removal of reaction slurry from the reactor. A piston type valve 34 is provided for closing off the outlet pipe from the reactor. This valve is preferably of the piston type since the piston or plunger renders the valve self-cleaning and can be pushed inwardly beyond the reactor wall. In closed position it normally lies substantialy flush with the inner wall 23 of the head thereby avoiding any pockets in which polymer might accumulate when outlet pipe 33 is closed and it may be withdrawn to such a point that no obstructions to the flow of slurry are caused by the valve when outlet pipe 33 is opened to permit discharge of reaction slurry.

A further pipe 35 provided with a similar piston valve 36 is provided at the top of the reactor and may function either as a second outlet for reaction slurry or as a feed inlet for the reactants. A further outlet pipe 37 may be arranged just below the baffle 17 in the event that it is desired to remove reaction slurry from a point outside the primary zone. A feed inlet is provided at 38 for supplying reactants to the reactor and an inlet is provided at 39 for supplying a suitable catalyst poison to the reactor in order to minimize "after polymerization" in the reactor.

The reactor head is preferably removable as a unit from the reactor since it is at times necessary to remove plugs of polymer from the interior surfaces of the reactor. Accordingly, all the pipe connections to the reactor head are provided with break connections as shown in order to permit ready removal of the reactor head. Connections are provided (but not shown) for dissolving polymer out with naphtha or other solvents, for purpose of cleaning the reactor.

Figure 4:
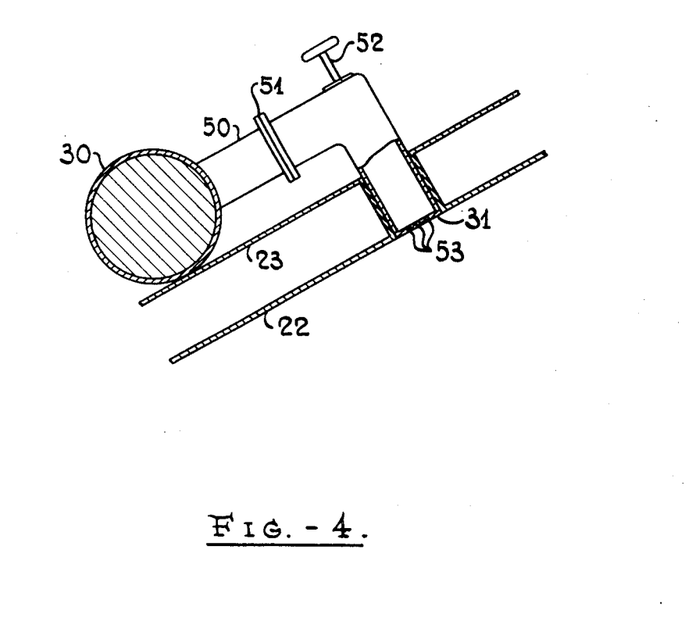
Figure 4 is a detail view in cross section of the catalyst manifold and spray nozzles of the reactor shown in Figure 1.

It is also desirable that the catalyst spray nozzles be readily removable from the reactor head. Figure 4 shows in detail on an enlarged scale a cross section of one type of construction of the catalyst manifold and a removable catalyst nozzle. In Figure 4, 30 is the manifold which surrounds the reactor head and supplies catalyst solution to a plurality of catalyst nozzles 31. A connecting pipe 50 provided with a break connection 51 is arranged for conducting the catalyst solution from the manifold to the spray nozzles. A valve 52 is arranged in the connecting pipe for controlling the flow of catalyst to the nozzles. The catalyst spray nozzles may be of any desired type although some advantages are gained by making the nozzles of the flush type as shown in Figure 4, since there is less chance of plug formation than if the nozzles 31 protruded into the reaction space or were arranged in recesses in the reactor head wall. A plurality of relatively fine orifices 53 are provided on the face of the nozzle in order to facilitate the uniform distribution of the catalyst solution in the reaction chamber. Instead of introducing the catalyst solution through nozzles as shown, the shaft 28 may be provided with a passageway leading to holes in the trailing edges of the blades of agitator 27 through which the catalyst may be passed into the reaction mixture.

The operation of the reactor in accordance with the present invention is substantially as follows: Olefinic reactants such as an isomonoolefin or mixtures of an isomonoolefin with a diolefin and a diluent such as methyl chloride are preferably precooled to a temperature of about −80° to about −100° C., introduced into the reactor through feed inlet 32 and/or pipe 35 and a suitable refrigerant such as liquid ethylene is introduced into the reactor cooling jacket through line 3, into the jacket of the reactor head through line 25 if the head is to be cooled and/or into the baffle plate if the baffle is to be cooled. When the reactor is filled, impeller 14 is placed in operation to cause the mixture of reactants to circulate upwardly through the central draft tube and downwardly through the annular channel or return tubes surrounding the central draft tube. Agitator 27 is also placed in operation in order to agitate the liquid in the primary zone 18. As an example, the relation between the circulation in the primary zone 18 and the secondary zone can be about as follows: The secondary zone, i. e., that portion below the baffle, has a volume of about 600 gallons while the primary zone has a volume of about 130 gallons. The impeller 14 is operated at such a speed as to give a circulation in the secondary zone of about 13,000 gals./min., while the circulation into and out of the primary zone is only about 400–800 gals./min. The circulation through the reaction chamber shown in Figure 1 depends upon the velocity head of the reaction mixture at the opening 19 in the baffle. This can be increased by increasing the speed of the impeller 14 or by extending the draft tube closer to the baffle place or it may be reduced by lowering the speed of the impeller and/or arranging baffles in front of the opening. The circulation through the baffle opening 19 may be controlled more positively by extending the drive shaft 28 and arranging a further impeller in the opening 19. The circulation through the primary zone is controlled so as to allow sufficient holdup time to permit substantially complete consumption or utilization of the catalyst in the primary zone. This is highly desirable since it avoids or at least reduces insofar as practicable, the reaction caused by highly diluted catalyst in the large heat exchanger vessel or secondary zone. A method for determining the completeness of the catalyst utilization in the primary zone is as follows:

500 cc. of slurry are withdrawn from the reactor at the point where the slurry leaves the primary zone and enters the cooling chamber. This sample is passed directly into a cold flask containing 50 cc. of an alcohol such as isopropyl alcohol for the purpose of immediately destroying unreacted catalyst. The alcohol should be sufficiently cold as to avoid vaporization or flashing of the withdrawn material. Cooling with dry ice to about −78° C. is sufficient. The polymer is recovered from the slurry and weighed.

A second 500 cc. sample of slurry is withdrawn from the same point and is held under anhydrous conditions at −78° C. or lower temperature (to about −93° C.) for 15 minutes. Polymer is then separated from this sample and weighed.

The excess of polymer obtained from the second sample over that obtained from the first sample is a measure of the residual activity of the catalyst in the stream leaving the reaction chamber. This excess of polymer in the second sample should not be more than about 25% of the total polymer formed in the second sample, and is preferably held below 10% or even below 5% by suitable control of the circulating reagents between the primary and secondary zones.

A limiting factor in the conduct of the process is the temperature rise due to the heat of chemical reaction. As a general rule, the maximum temperature rise permissible in the primary zone is about 3 to 10° F. The control of the temperature rise within the primary zone is controlled by the rate of catalyst addition thereto, adequate circulation being provided so that the reactants are always at least equal to and are preferably in substantial excess of the amount capable of being polymerized by the catalyst present. The motor 29 or other source of power for the agitator 27 is desirably of a variable speed type so that the speed of the agitator can be reduced as much as possible and yet avoid settling or agglomeration in the primary zone. The purpose of this is to work in the direction of the highest local catalyst concentration to speed up reaction rate.

Figure 2:
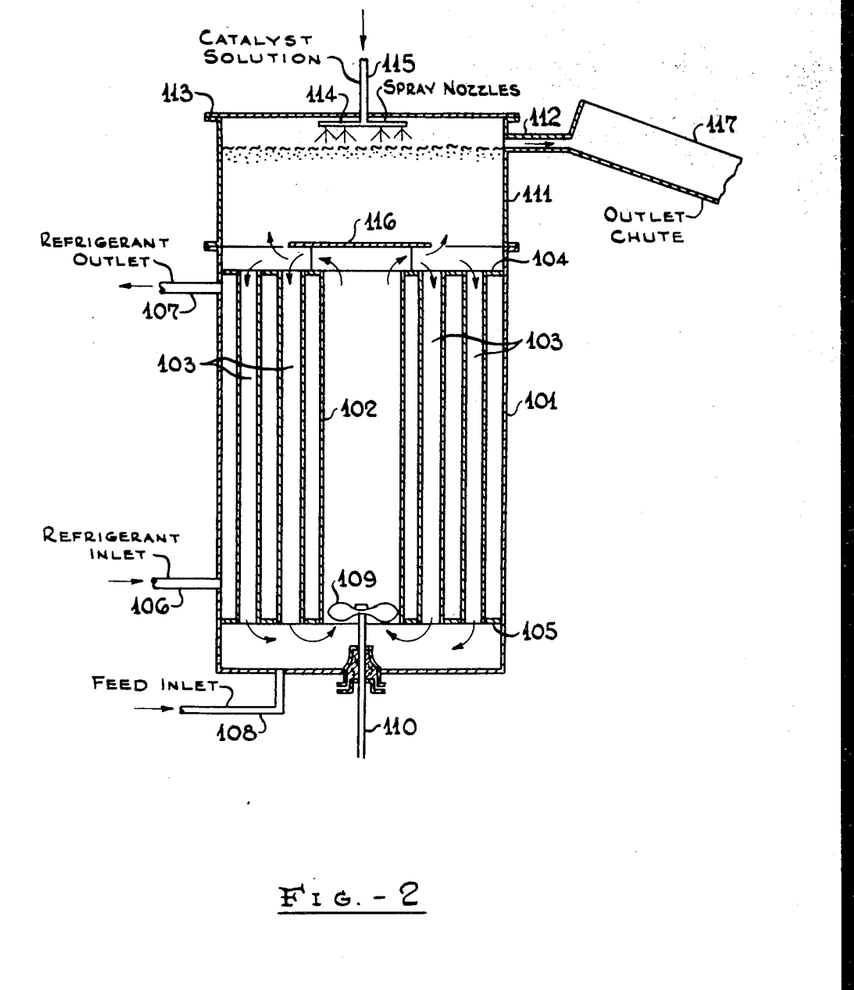
Figure 2 is a vertical sectional view of a modified form of reactor utilizing the principle of the present invention.

The reactor shown in Figure 2 comprises an outer shell 101 having a central draft tube 102 and a plurality of return tubes 103 supported between an upper tube sheet 104 and lower tube sheet 105. An inlet 106 and an outlet 107 are provided for the introduction of a suitable refrigerant into the space between the said headers and around the central draft tube and return tubes and an inlet pipe 108 is provided for the introduction of feed into the reactor. An agitator 109 mounted on drive shaft 110 is arranged at the bottom of the central draft tube in order to circulate the reaction mixture.

The top of the reactor comprises a cylindrical shell 111 having an overflow outlet 112. A cover or head 113 provided with quick opening means of any desired type closes the top of the reactor. A manifold 114 carrying a plurality of spray nozzles is attached to the cover member and is connected to pipe 115 supplying catalyst solution to the manifold. A baffle 116 which may desirably be supported from the upper tube sheet 104 is arranged opposite the outlet end of the central draft tube. The baffle 116 serves to divide the reactor into two essential parts, a lower heat exchange portion or secondary zone in which the reaction mixture is in rapid, turbulent flow and an upper reaction space or primary zone wherein the reaction liquid is in a mildly agitated condition. Catalyst solution sprayed from the manifold 114 strikes the surface of the reaction mixture and due to the low degree of agitation occurring in the primary zone it remains in rather high concentration for a period sufficient to effect substantially complete utilization of the catalyst. The reaction slurry overflows at 112 and is discharged to suitable processing equipment through outlet chute 117.

Figure 3:
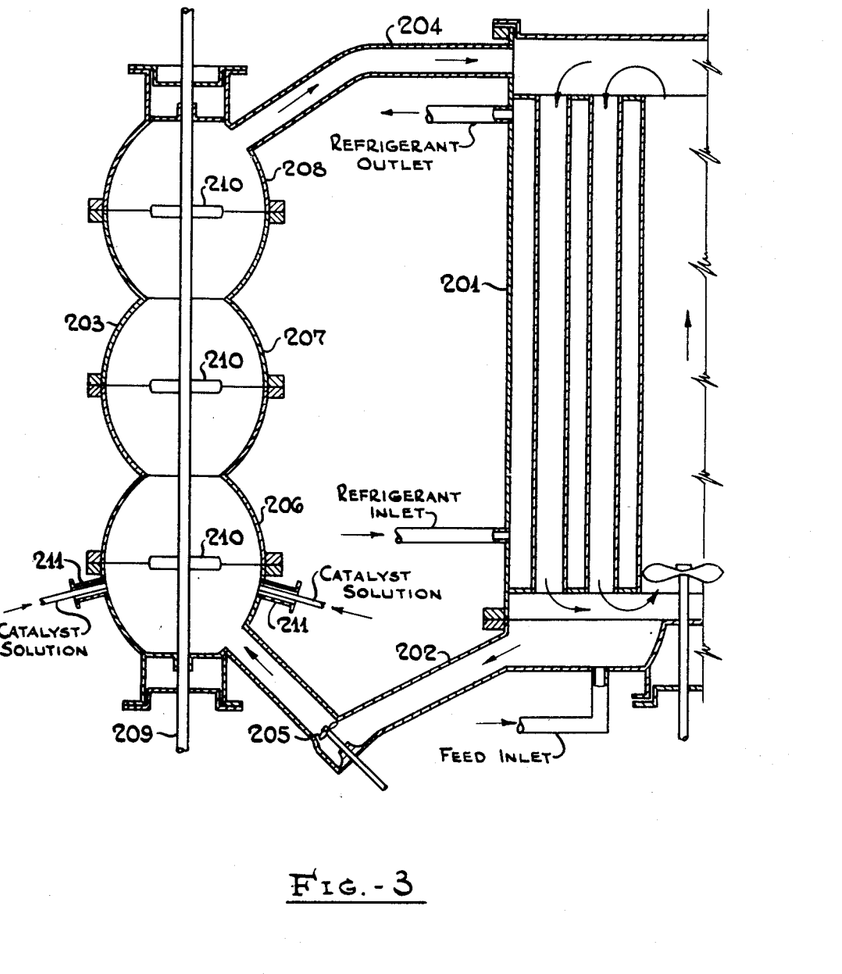
Figure 3 illustrates another modification wherein the primary zone is located in a separate vessel connected to a larger recirculating heat exchanger vessel.

A further embodiment of the present invention is illustrated in Figure 3 and in this embodiment, the primary zone comprises a plurality of reaction chambers in a loop of pipe separate from but connected to a heat exchanger section. In Figure 3, 201 represents the secondary zone or heat exchanger vessel which may be of the form shown in Figure 1, i. e., with a central draft tube and an annular return passageway or with a central draft tube and a multiplicity of return tubes as shown in Figure 2. A pipe 202 connects with the bottom of the heat exchanger or secondary zone for withdrawing part of the circulating reaction mixture and passing it to the reaction chamber or primary zone designated generally as 203. A second pipe 204 connects the top of the reaction chamber 203 with the heat exchanger 201. A pump 205 connected to a suitable drive shaft, the speed of which is desirably variable, is provided in connecting pipe 202 in order to control the circulation of reaction mixture from the heat exchanger, through the reaction chamber and back into the heat exchanger. The reaction chamber 203 comprises a plurality of catalyst addition chambers 206, 207 and 208 arranged in series. A drive shaft 209 carrying agitator blades 210 is arranged in the reaction chamber in order to keep the reaction mixture passing therethrough properly agitated. Catalyst addition nozzles 211 are arranged around one or more of the catalyst addition chambers. Means for measuring the temperature of the reaction mixture entering and leaving the reaction zone are usually provided and may, if desired, be coupled with suitable control means for varying the speed of circulation or the rate of addition of catalyst in order that the temperature rise may not be prohibitively high. Ordinarily the maximum temperature rise permissible is about 10° F. and if the temperature tends to rise a greater amount, it may be brought within permissible limits by either increasing the rate of circulation through the primary zone or by decreasing the flow of catalyst solution or both. Although the feed inlet is shown entering the heat exchanger section 201, it will be understood that the feed inlet could be attached to one of the catalyst addition chambers or to either of the connecting pipes. In this arrangement also it is possible to maintain a high concentration of catalyst in the reaction zone and for a period sufficient to effect substantially complete utilization of the catalyst. A further advantage of this arrangement is gained when adding a catalyst poison such as ammonia to the secondary zone to kill off residual catalyst. This can be more readily controlled in this system than when trying to add both catalyst and poison to the same chamber since it may be added in the return pipe 204 wherein it is most effective in destroying residual catalyst.

The present invention is applicable to the preparation of solid, high molecular weight, low temperature polymerizates from isoolefinic materials alone or from mixtures of isoolefinic materials with diolefinic materials capable of copolymerization with isoolefins. The preferred isomonoolefin is isobutylene but other isoolefins containing up to about 8 carbon atoms per molecule may be used. The copolymerizable diolefinic materials include butadienes and substituted butadienes, especially isoprene, piperylene and dimethylbutadiene. Other multiolefinic materials containing up to 12 or 14 carbon atoms per molecule such as myrcene and certain non-conjugated diolefins, such as dimethylallene and the like, are also useful. The ratio of isoolefin to diolefin in the liquid is from about 50 to 95 weight percent of isoolefin to about 50 to 5 weight percent of diolefin when the latter is a $C_4$ diolefin. With $C_5$ and higher diolefins, the amount of diolefin fed is less than 10 weight percent and preferably less than 5 weight percent.

The reaction is preferably carried out in the presence of an inert, low-freezing diluent such as liquid methane, ethane or ethylene or in an alkyl halide of less than about 4 carbon atoms, preferably methyl or ethyl chloride. The catalysts conveniently may be aluminum chloride or any of the Friedel-Crafts type catalysts described in an article entitled "Friedel-Crafts synthesis" by N. O. Calloway in "Chemical Reviews," vol. 17, 1935, particularly at page 375. The catalysts are preferably used in solution in a low-freezing, non-complex forming solvent such as an alkyl halide containing less than about 4 carbon atoms, such as methyl or ethyl chloride, carbon disulfide or the like.

There are certain conditions under which the polymer slurries are unstable and, of course, such conditions must be carefully avoided in order to conduct the process successfully. Agglomeration of the polymer and destruction of the polymer is favored by higher temperatures, lower molecular weight of the polymer, the use of diluents which tend to be mutually soluble with the polymer under the operating conditions and insufficient as well as excessive degree of dispersion of the catalyst.

Stable slurries of polybutenes can be produced at −90° C. with methyl chloride-isobutylene feeds by maintaining a volume ratio of methyl chloride to isobutylene over about 0.7:1 in the reaction-mixture, with good agitation throughout the slurry (Reynolds numbers over about 5,000–6,000 and preferably over 10,000). At higher temperatures, higher diluent ratios are required and at temperatures above about −50° C. a slurry cannot in general be formed because of increased agglomeration tendency due to increased mutual solubility of hydrocarbon and polymer at higher temperatures. This is aggravated by a lowering in molecular weight at increased temperature as described by Thomas, Sparks, Frolich, Otto and Muller-Cunradi in the "Journal of the American Chemical Society," vol. 62, page 276 (1940). As is also indicated in that article, impurities in the reaction mixture tend to lower the molecular weight and the lower the molecular weight of the polymer the higher the diluent ratio required to form a satisfactory slurry.

The same general principles apply to the production of low temperature isoolefin-diolefin copolymerizate slurries. The molecular weights of these polymers, as determined by the Staudinger method, are considerably lower than those of polybutenes prepared under otherwise similar conditions. This effect is attributable to the presence of diolefin in the reaction mixture. At −90° C., diluent ratios above 1:1 and preferably over 2:1 should obtain in the reaction zone. In the manufacture of these coplymers the reaction temperature should not exceed about −70° C. When using aluminum chloride-methyl chloride catalyst solutions, the concentration of aluminum chloride should be not over about 1 gram per 100 cc.

Low temperature isoolefin-diolefin copolymers of normal molecular weight, i. e., having a Staudinger molecular weight of about 30,000 and above can easily be maintained as a slurry provided that the percent hydrocarbon or other mutual solvent is not too high. Thus when the reaction liquid contains 60–90 weight percent of methyl chloride, the slurries containing polymer averaging over roughly 30,000 molecular weight are quite stable, but if the percentage of methyl chloride is reduced to about 30% the slurry becomes unstable and the polymer particles tend to agglomerate. With increasing diolefin content of the isoolefin-diolefin feed, the molecular weight of the resultant copolymer is lowered and the temperature necessary for the maintenance of a stable slurry is lowered. Increasing diluent ratio will also compensate, to a limited extent, for lower molecular weight of polymer, thereby permitting slurry formation.

The foregoing description contains a limited number of embodiments of the present invention but it will be understood that numerous variations are possible without departing from the purview of this invention as defined in the following claims.

What we claim and desire to secure by Letters Patent is:

1. The method of preparing olefinic polymerizates by polymerization under the influence of a Friedel-Crafts active metal halide catalyst at temperatures within the range between $-10°$ F. and $-164°$ C., comprising the steps in combination of mixing together continuing streams of an olefin and a diluent, multiply circulating the mixture in indirect heat exchange relation with a refrigerant having a boiling point at the desired temperature within the stated range to maintain a low temperature in the mixture and remove heat of reaction, thereby producing a body of stirred, circulated, cold olefinic-diluent mixture, diverting a minor portion of said circulating stream into a smaller volume, maintaining substantial turbulence in the respective portions of the circulating mixture, injecting a continuing stream of catalyst solution into the smaller volume at a rate low enough to permit substantially complete utilization of the catalyst in the smaller volume and maintaining the low temperature by re-transfer of partly polymerized olefinic mixture to the larger volume in heat exchange relation with the refrigerant, whereby no portion of the olefinic material undergoes a temperature rise of more than $10°$ F., while in the circulating volume and discharging a continuing stream of polymer in diluent from the circulating mixture, equivalent to the combined streams of olefin, diluent and catalyst solution.

2. The method of preparing olefinic polymerizates by polymerizing a mixture of a significant proportion of an isoolefin having from 4 to 8, inclusive, carbon atoms per molecule with a minor proportion of a multiolefin having 4 to 14, inclusive carbon atoms per molecule, with a low freezing inert diluent, by the application thereto of a solution of a Friedel-Crafts active metal halide catalyst at a temperature within the range between $-10°$ F. and $-164°$ C. comprising the steps in combination of mixing together continuing streams of olefin and diluent, multiply circulating the olefinic-diluent mixture in indirect heat exchange relationship with a refrigerant having a boiling point at the desired point within the stated range, diverting a portion of the circulating stream through a smaller volume, maintaining substantial turbulence in the circulating system, injecting a continuing stream of a fluid Friedel-Crafts catalyst into the smaller volume at a rate of such as to permit substantially complete utilization of the catalyst within the smaller volume with a temperature rise of no more than approximately $10°$ F. and transferring a continuous stream of mixture between the first mentioned volume in heat exchange relationship and the second mentioned smaller volume; an overflow stream equal to the input stream of mixture being taken from the first mentioned circulating portion.

3. The method of preparing polymerizates by polymerizing a mixture of a major proportion of isobutylene with a minor proportion of a conjugated butadiene having from 4 to 14, inclusive carbon atoms per molecule at a temperature within the range between $-10°$ F. and $-164°$ C., in the presence of a diluent which is liquid at the polymerization temperature and non-reactive under the polymerization conditions comprising the steps in combination of mixing together continuing streams of olefin and diluent, multiply circulating the olefinic-diluent mixture in indirect heat exchange relationship with a refrigerant having a boiling point at the desired temperature, diverting a portion of the circulating stream from the said heat exchange relationship into a smaller volume, maintaining substantial turbulence throughout the circulating system, injecting a continuing stream of catalyst into the smaller volume at a rate such as to permit substantially complete utilization of the catalyst within the smaller volume and a maximum temperature rise of no more than about $10°$ F., returning a stream from the smaller volume into heat exchange relationship to maintain the desired low temperature and discharging an overflow stream containing polymer from the circulating stream.

4. A polymerization process for olefinic mixtures comprising the steps in combination of delivering a continuing stream of cold liquid reactant material comprising an olefin having from 4 to 14, inclusive, carbon atoms per molecule at a temperature within the range between $-10°$ F. and $-164°$ C. into a circulating zone in indirect heat exchange relationship with a refrigerant, diverting a portion of the material in said circulating zone to a smaller circulating volume, maintaining substantial turbulence in both zone and volume, delivering to said smaller volume a continuing stream of fluid Friedel-Crafts catalyst to the said smaller volume at a rate such that substantially complete catalyst utilization occurs within the smaller volume to produce a maximum temperature rise of no more than $10°$ F., returning a portion of liquid from said smaller volume to said circulating zone to remove the heat of reaction and withdrawing an overflow stream of polymer slurry from the circulating system.

5. A polymerization process for olefins comprising the steps in combination of mixing together continuing streams of a major proportion of an isoolefin having from 4 to 8, inclusive, carbon atoms per molecule and a minor proportion of a multiolefin having from 4 to 14, inclusive, carbon atoms per molecule at a temperature within the range between $-10°$ F. and $-164°$ C., delivering a continuing stream of mixed olefins under a condition of substantial turbulence to a circulating zone, withdrawing a portion of said mixture from said circulating zone to a smaller volume, delivering a continuing stream of fluid Friedel-Crafts active metal halide catalyst to the portion of mixture in the smaller volume, at a rate such that substantially complete catalyst utilization occurs within the smaller zone to produce a temperature rise of no more than 10° F., returning an equal portion of mixture and polymer to the circulating portion of mixture, cooling the mixture and solid polymer therein for return to the smaller volume and withdrawing an overflow stream of material containing solid polymer from the system.

6. A polymerization process for olefinic materials comprising the steps in combination of mixing together continuing streams of a major proportion of an isoolefin having from 4 to 8, inclusive carbon atoms per molecule with a minor proportion of a diolefin having from 4 to 14, inclusive, carbon atoms per molecule, at a temperature within the range between −10° F. and −164° C., delivering a continuous stream of the mixture into a reaction volume, delivering to the mixture in said reaction volume a continuing stream of fluid Friedel-Crafts catalyst at a rate such that substantially complete catalyst utilization occurs within said volume with a temperature rise of no more than 10° F., discharging from said volume a stream equal to the input stream, to a circulating zone under conditions of substantial turbulence in indirect heat transfer relationship with a refrigerant for the rapid removal of heat by indirect cooling and maintaining cooling in the reaction volume by the delivery thereto of cooled material, and simultaneously withdrawing from the system a slurry of polymer in copolymerized mixture.

7. The method of preparing olefinic polymerizates of a major proportion of isobutylene and a minor proportion of a diolefin hydrocarbon having from 4 to 6, inclusive, carbon atoms per molecule in an alkyl halide diluent containing less than 4 carbon atoms per molecule by the action of a fluid Friedel-Crafts catalyst at a temperature within the range between −10° F. and −164° C., comprising the steps in combination of circulating continuing streams of the isobutylene-diolefin-diluent mixture in indirect heat exchange relationship with a refrigerant having a boiling point at the desired temperature, withdrawing a portion of the said mixture from circulating relationship and delivering it to a smaller reaction volume, maintaining substantial turbulence in the circulating system and the smaller volume, delivering on a continuing stream of the fluid catalyst into the smaller volume at a rate such as to permit substantially complete utilization of the catalyst within the smaller volume with a temperature rise of no more than 10° F., and returning a mixture of olefin and polymer to the circulating body for recooling.

8. The method of preparing olefinic polymerizates by polymerization under the influence of a Friedel-Crafts active metal halide catalyst at a temperature in the range −10° F., and −164° C., comprising the steps in combination of mixing together continuing streams of an olefin and a diluent, multiply circulating the mixture in indirect heat exchange relationship with a refrigerant having a boiling point at the desired temperature in the mixture, thereby producing a body of stirred, circulated, cold, olefinic diluent mixture, circulating at a rate of approximately 13,000 gallons per minute, diverting a minor portion of said circulating stream into and out of a smaller volume, maintaining substantial turbulence in the respective portions of the circulating mixture, including a circulating rate of 400 to 800 gallons per minute in and out of the minor portion, injecting a continuing stream of catalyst solution into the smaller volume at a rate low enough to permit substantially complete utilization of the catalyst in the smaller volume, and maintaining the low temperature by re-transfer of partly polymerized olefinic mixture to the larger volume in heat exchange relationship with the refrigerant, whereby no portion of the olefinic material undergoes a temperature rise of more than 10° F., while in the circulating volume, and discharging a continuing stream of polymer in diluent from the circulating mixture, equivalent to the combined streams of olefin, diluent and catalyst solution.

9. The method of preparing polymerizates by treating a mixture of a major proportion of isobutylene and a minor proportion of a diolefin hydrocarbon containing from four to six carbon atoms per molecule in an alkyl halide diluent containing less than 4 carbon atoms per molecule with a solution of a Friedel-Crafts catalyst in an alkyl halide solvent containing less than 4 carbon atoms per molecule at temperatures below about −70° C. which consists in adding a mixture of isobutylene and the diolefin to the system continuously, circulating the reaction liquid in indirect heat exchange relation with a suitable refrigerant to remove heat of reaction, diverting a portion of the circulating reaction liquid through a reaction zone of small volume as compared with the entire system, maintaining high internal agitation throughout the entire system, injecting the catalyst into the reaction zone, maintaining the nominal holdup time of the reaction zone and the rate of catalyst addition at such a level as to permit substantially complete utilization of the catalyst therein with a maximum temperature rise of about 10° F., and continuously withdrawing a slurry of polymer from the system.

10. The method of preparing polymerizates by treating a mixture of a major proportion of an isolefin of up to 8 carbon atoms per molecule with a minor proportion of a multiolefin of up to 14 carbon atoms in a diluent with a solution of a Friedel-Crafts catalyst at temperatures below about −70° C. which comprises circulating the reaction mixture through a secondary zone in indirect heat exchange relation with a suitable refrigerant to remove heat of reaction, diverting a portion of the circulating stream through a primary zone of small volume as compared with the entire system, maintaining high internal agitation throughout the entire system, injecting the catalyst into the primary zone, adding a catalyst poison to the reaction mixture as it passes in indirect heat exchange relationship to the refrigerant, thereby destroying residual catalyst and preventing after-polymerization; maintaining the nominal holdup time of the primary zone and the rate of catalyst addition at such a level as to permit substantially complete utilization of the catalyst therein with a maximum temperature rise of about 10° F., and discharging at least a portion of the reaction mixture from the primary zone into the secondary zone.

11. The method of preparing polymerizates by treating a mixture of a major proportion of isobutylene with a minor proportion of a conjugated butadiene hydrocarbon in a diluent with a solution of a Friedel-Crafts catalyst at temperatures below about −70° C., which comprises circulating the reaction mixture through a secondary zone in indirect heat exchange relation with a suitable refrigerant to remove heat of reaction, diverting a portion of the circulating stream through a primary zone of smal volume as compared with the entire system, maintaining high internal agitation throughout the entire system, injecting the catalyst into the primary zone, adding a catalyst poison to the reaction mixture as it passes in indirect heat exchange relationship to the refrigerant, thereby destroying residual catalyst and preventing after-polymerization; maintaining the nominal holdup time of the primary zone and the rate of catalyst addition at such a level as to permit substantially complete utilization of the catalyst therein with a maximum temperature rise of about 10° F., and discharging at least a portion of the reaction mixture from the primary zone into the secondary zone.

12. A polymerization process which comprises supplying liquid reactants comprising an isoolefin of up to 8 carbon atoms per molecule to an agitated primary reaction zone, supplying a solution of a Friedel-Crafts catalyst to the reactants in said zone, maintaining the holdup time and the rate of catalyst addition such that substantially complete catalyst utilization with a maximum temperature rise of 10° F., occurs in said primary reaction zone, passing the reaction mixture from the said reaction zone to a secondary reaction and cooling zone wherein the circulation rate is high and heat is rapidly removed by indirect cooling, adding a catalyst poison to the reaction mixture in the secondary reaction and cooling zone, thereby destroying residual catalyst and preventing after-polymerization, cooling the primary reaction zone by addition thereto of controlled amounts of cooled materials from said secondary zone and withdrawing a slurry of polymer from the system.

13. A polymerization process which comprises supplying a liquid mixture of a major proportion of an isomonoolefin of up to 8 carbon atoms per molecule and a minor proportion of a diolefin of from 4 to 6 carbon atoms per molecule to an agitated primary reaction zone, supplying a solution of a Friedel-Crafts catalyst in an alkyl halide containing less than 4 carbon atoms per molecule to the reactants in said zone, maintaining the holdup time and the rate of catalyst addition such that substantially complete catalyst utilization with a maximum temperature rise of 10° F. occurs in said primary reaction zone, passing the reaction mixture from the said reaction zone to a secondary reaction and cooling zone wherein the circulation rate is high and heat is rapidly removed by indirect cooling, adding a catalyst poison to the reaction mixture in the secondary reaction and cooling zone, thereby destroying residual catalyst and preventing after-polymerization, cooling the primary reaction zone by addition thereto of controlled amounts of cooled materials from said secondary zone and withdrawing a slurry of polymer from the system.

14. The method of preparing polymerizates by treating a mixture of a major proportion of isobutylene and a minor proportion of a diolefin hydrocarbon containing from 4 to 6 carbon atoms per molecule in an alkyl halide diluent containing less than 4 carbon atoms per molecule with a solution of a Friedel-Crafts catalyst in an alkyl halide solvent containing less than 4 carbon atoms per molecule at temperatures below about −70° C., which consists in circulating the reaction liquid in indirect heat exchange relation with a suitable refrigerant to remove heat of reaction, diverting a portion of the circulating reaction liquid through a reaction zone of small volume as compared with the entire system, maintaining high internal agitation throughout the entire system, injecting the catalyst into the reaction zone, adding a catalyst poison to the reaction mixture as it passes in indirect heat exchange relationship to the refrigerant, thereby destroying residual catalyst and preventing after-polymerization, maintaining the nominal holdup time of the reaction zone and the rate of catalyst addition at such a level as to permit substantially complete utilization of the catalyst therein with a maximum temperature rise of about 10° F.

FRANK A. HOWARD.
A. DONALD GREEN.

REFERENCES CITED

The following references are of record in the file of this patent:

UNITED STATES PATENTS

| Number | Name | Date |
|---|---|---|
| Re. 22,210 | De Simo et al. | Oct. 27, 1942 |
| 531,108 | Forbes | Dec. 18, 1894 |
| 2,171,250 | Archibald | Aug. 29, 1939 |
| 2,173,986 | Stuart | Sept. 26, 1939 |
| 2,308,786 | Smith | Jan. 19, 1943 |
| 2,317,878 | Bannon | Apr. 27, 1943 |